United States Patent
Ryman

(10) Patent No.: US 11,788,656 B2
(45) Date of Patent: Oct. 17, 2023

(54) CONNECTOR

(71) Applicant: Oetiker Schweiz AG, Horgen (CH)

(72) Inventor: Morgan Ryman, Anderstorp (SE)

(73) Assignee: Oetiker Schweiz AG, Horgen (CH)

( * ) Notice: Subject to any disclaimer, the term of this patent is extended or adjusted under 35 U.S.C. 154(b) by 160 days.

(21) Appl. No.: 17/295,923

(22) PCT Filed: Nov. 23, 2018

(86) PCT No.: PCT/EP2018/082368
§ 371 (c)(1),
(2) Date: May 21, 2021

(87) PCT Pub. No.: WO2020/104040
PCT Pub. Date: May 28, 2020

(65) Prior Publication Data
US 2022/0010903 A1    Jan. 13, 2022

(51) Int. Cl.
*F16L 33/30* (2006.01)
*F16L 55/11* (2006.01)

(52) U.S. Cl.
CPC ............... *F16L 33/30* (2013.01); *F16L 55/11* (2013.01)

(58) Field of Classification Search
CPC .................................. F16L 33/30; F16L 55/11
See application file for complete search history.

(56) References Cited

U.S. PATENT DOCUMENTS

| 5,429,394 A * | 7/1995 | Olson ................. F16L 37/0927 285/23 |
| 7,896,403 B2 * | 3/2011 | Zanardi ............... F16L 19/0206 285/133.11 |
| 2005/0121909 A1 | 6/2005 | Densel |
| 2007/0052232 A1 * | 3/2007 | Gunderson ......... F16L 37/0987 285/305 |

FOREIGN PATENT DOCUMENTS

| EP | 1596118 A1 | 11/2005 |
| EP | 2752609 A1 | 7/2014 |
| GB | 1326349 A | 8/1973 |
| JP | H09504350 A * | 4/1997 |
| JP | 2000513427 A * | 10/2000 |
| JP | 2003247684 A * | 9/2003 ............ F16L 13/143 |

OTHER PUBLICATIONS

International Search Report Form PCT/ISA/210, and Written Opinion Form PCT/ISA/237, International Application No. PCT/EP2018/082368, pp. 1-14 International Filing Date Nov. 23, 2018.

* cited by examiner

*Primary Examiner* — James M Hewitt, II
(74) *Attorney, Agent, or Firm* — Bond, Schoeneck & King, PLLC; David L. Nocilly

(57) ABSTRACT

A connector has an outer surface for engagement by a hose, an inner through-bore (13) for receiving a pipe nipple to be connected to the hose, and a sealing O-ring (12) for sealing the hose to the pipe nipple. Up to the final assembly of the connector, a plug (15) is placed in the through-bore (13) to hold the parts of the connector together and protect its interior against the entry of dirt. The plug (15) has a shaft (16) to be inserted into the through-bore (13) and an end disc (17) for closing an end of the through-bore (13). A plurality of connectors may be linked together to form a belt-type arrangement for handling in an automatic assembly line.

2 Claims, 1 Drawing Sheet

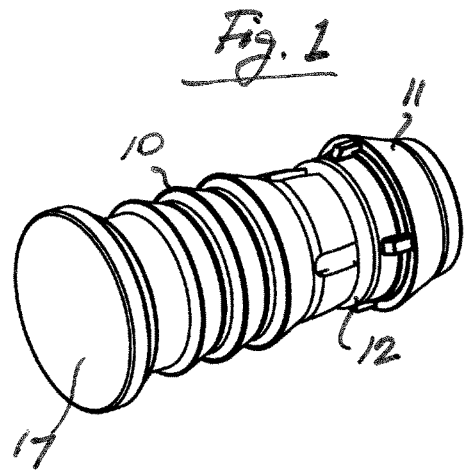
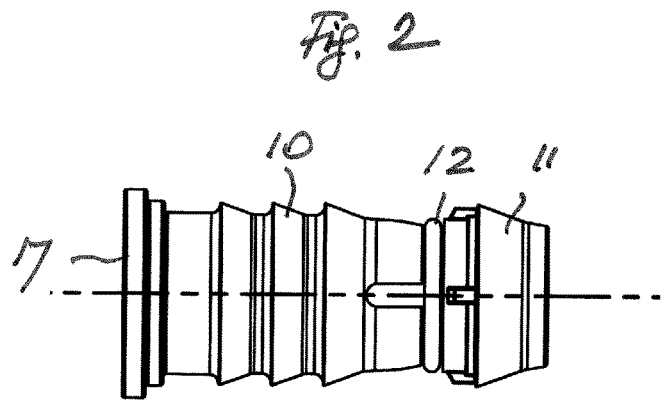
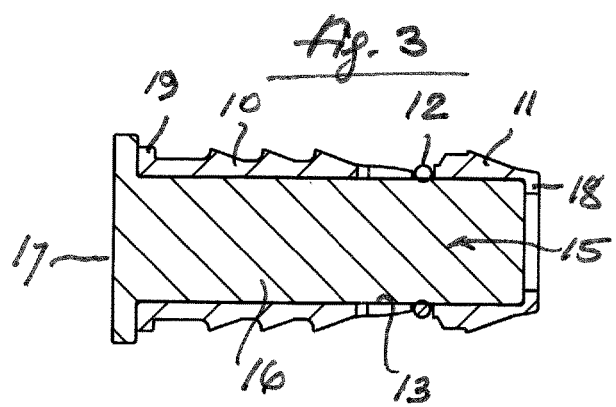
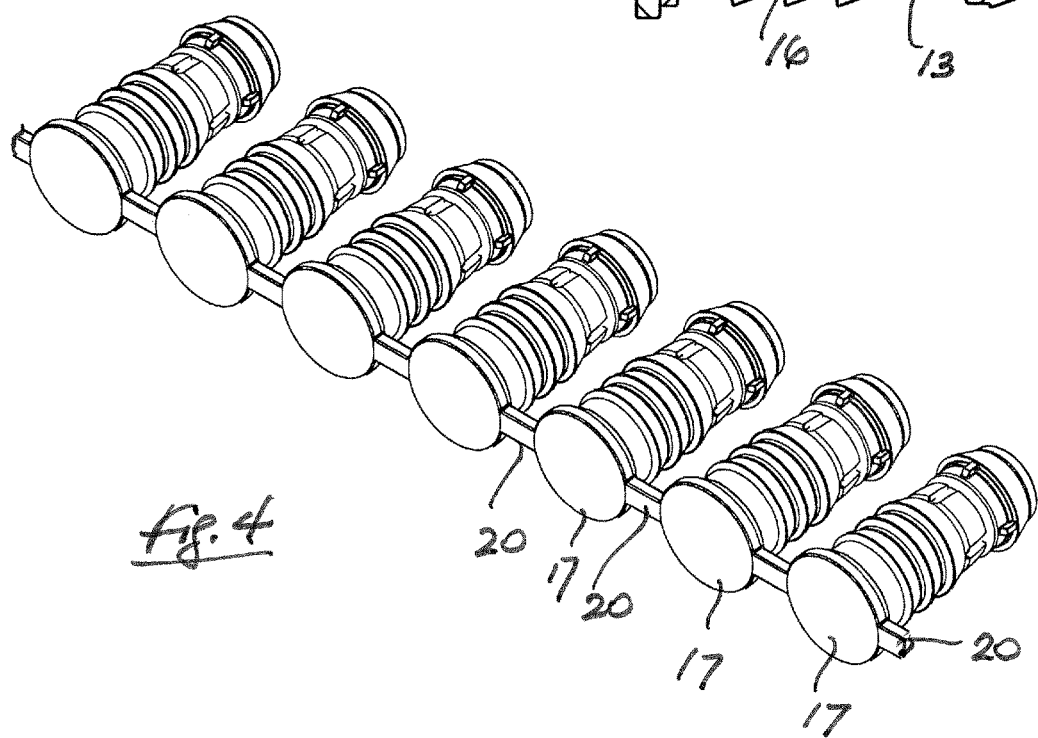

CONNECTOR

CROSS-REFERENCE TO RELATED APPLICATIONS

The present application is a US national phase of PCT Application No. PCT/EP2018/082368, filed on Nov. 23, 2018, the disclosure of which is incorporated herein by reference in its entirety.

PRIOR ART

Hose-pipe connectors are known that are made of a number of structural parts including O-rings for sealing against the hose and the pipe. In assembly, the connector is inserted into the end of the hose and, finally, the pipe is pushed into a through-bore of the connector.

SUMMARY OF THE INVENTION

It is a general object of the present invention to overcome deficiencies as occur with prior-art connectors. As a more specific object, the invention seeks to provide a connector that is easier to handle during assembly and is, preferably, suited to be handled by an automatic assembly line. This object is met by a connector which has an outer surface for engagement by a hose, an inner through-bore for receiving a pipe nipple to be connected to the hose, sealing means for sealing the hose to the pipe nipple, and a plug that has a shaft adapted to be inserted into the through-bore and an end disc for closing an end of the through-bore in a non-installed condition of the connector.

The invention is specifically suited for connectors of the type disclosed in the co-pending international PCT application filed for the same applicant simultaneously with the present application and entitled "Multi-part connector assembly", where the plug has also the purpose of holding the three parts of the connector together until the connector is finally assembled with the hose and pipe.

The invention also relates to a connector arrangement which includes a plurality of connectors as referred to above, wherein each pair of adjacent end discs are interconnected by a severable web formed integrally with the end discs.

DRAWING

An embodiment of the invention will be explained with reference to the drawing in which:

FIG. 1 is a perspective view of a connector;
FIG. 2 is a side view of the connector of FIG. 1;
FIG. 3 is a cross-section of the connector of FIGS. 1 and 2; and
FIG. 4 is a perspective view of an arrangement which includes a plurality of the connectors shown in FIGS. 1 to 3.

EMBODIMENT

The connector shown in FIGS. 1 to 3, which is intended to connect a hose (not shown) to a pipe nipple (not shown), comprises a front tubular member 10, a rear tubular member 11 and a sealing O-ring 12. The front and rear tubular members 10, 11 have the same inner diameter and form a common through-bore 13 for receiving the pipe nipple. The outer surfaces of the front and rear members 10, 11 are formed with annular projections for gripping the hose. The O-ring 12 has a generally circular cross-section, its inner and outer diameters being so dimensioned that it projects inward into the through-bore 13 and projects outward beyond the adjacent portions of the tubular members 10 and 11. In the finally assembled condition of the hose and pipe nipple connection, the O-ring 12 will thus bear on the outer side of the pipe nipple and on the inner side of the hose.

In the condition illustrated in the drawings, a plug 15 is placed in the through-bore 13. The plug 15 has a shaft 16 which is generally cylindrical with an outer diameter corresponding to that of the pipe nipple for which the connector is intended. When fully inserted, the inner end of the shaft 16 abuts an inner flange 18 formed at the rear end of the rear tubular member 11 and a disc 17 formed at the end of the plug 15 abuts an outer flange 19 provided at the front end of the front tubular member 10.

The plug 15 serves to hold the three parts 10, 11 and 12 of the connector together and to seal the interior of the connector against dirt until the connector is finally assembled with a hose and a pipe nipple. In addition, the plug facilitates pressure testing prior to final assembly.

FIG. 4 illustrates a belt-type connector arrangement in which a plurality of connectors, each as shown in FIGS. 1 to 3, are linked together by webs 20 that are made integrally with the discs 17, each interconnecting a pair of adjacent plugs 15. This arrangement is of advantage in that it facilitates packaging and shipping and, especially, processing in an automatic assembling plant, where the interconnecting webs (20) are severed.

REFERENCE NUMBERS

10 Front tubular member
11 Rear tubular member
12 O-ring
13 Through-bore
15 Plug
16 Shaft
17 Disc
18 Inner flange
19 Outer flange
20 Web

The invention claimed is:

1. A connector arrangement, comprising:
a plurality of connectors, each connector comprising an outer surface dimensioned for engagement by a hose, an inner through-bore (13) dimensioned for receiving a pipe nipple to be connected to the hose, and sealing means (12) for sealing the hose to the pipe nipple; and
a plurality of plugs (15), each plug (15) having a shaft (16) which is inserted into the through-bore (13) and an end disc (17) for closing an end of the through-bore (13) in a non-installed condition of the connector;
wherein each pair of adjacent end discs (17) are interconnected by a severable web (20) formed integrally with each of the pair of adjacent end discs (17); and
wherein each shaft (16) contacts a respective sealing means (12).

2. The connector of claim 1, wherein the shaft (16) and the disc (17) are one integral structural part.

* * * * *